United States Patent

[11] 3,530,924

[72] Inventor Hans Domning
 Kassel, Germany
[21] Appl. No. 709,477
[22] Filed Feb. 29, 1968
[45] Patented Sept. 29, 1970
[73] Assignees Wintershall Aktiengesellschaft
 Kassel, Germany;
 Wyss Escher GmbH,
 Ravensburg, Wurttemberg Germany
[32] Priority March 3, 1967, March 3, 1967, April 1, 1967
[33] Germany
[31] W 43,483; W 43,484; W 43,674

[54] CRYSTALLIZATION METHOD AND DEVICE
 11 Claims, 2 Drawing Figs.
[52] U.S. Cl..................................................... 159/45,
 159/47, 23/273
[51] Int. Cl..................................................... B01d 3/06,
 B01d 3/10
[50] Field of Search........................................... 23/301,
 273L, 295; 159/43, 45, 17

[56] References Cited
UNITED STATES PATENTS
1,945,281 1/1934 Leithauser..................... 159/45

| | | | |
|---|---|---|---|
| 2,602,023 | 7/1952 | Simms.......................... | 23/301 |
| 2,631,926 | 3/1953 | Eckstrom...................... | 23/273(L)UX |
| 2,671,011 | 3/1954 | Ackeren........................ | 23/273(L)UX |
| 3,080,300 | 3/1963 | Smith............................ | 196/114 |
| 3,064,721 | 11/1962 | Witte............................. | 159/2 |
| 3,202,487 | 8/1965 | Domning...................... | 23/273(L)UX |
| 3,306,710 | 2/1967 | Messing........................ | 23/273(L)UX |

Primary Examiner—Norman Yudkoff
Assistant Examiner—J. Sofer
Attorney—Michael S. Striker ABSTRACT: A crystallization process carried out in a plurality of successive units each including an upright crystallizing chamber communicating at the bottom end thereof with an upright separating chamber, in which a suspension of crystals in a crystallizable solution is introduced in the crystallizing chamber of each unit while a fluid is introduced in upward direction through the separating chamber to flow from there into the crystallizing chamber so that crystals growing in the latter and new crystals forming therein will descend into the separating chamber in countercurrent to the fluid rising therein. The speed of the rising fluid may be adjusted to control the minimum size of crystals descending into the separation chamber and the crystals descending into the separating chamber are transferred from the bottom of the latter into the crystallizing chamber of the adjacent unit.

CRYSTALLIZATION METHOD AND DEVICE

BACKGROUND OF THE INVENTION

U.S. Pat. No. 3,202,487 and German Pat. No. 1,107,200 disclose a method for obtaining coarse crystalline salts by vacuum cooling of a solution in a series of steps with continuous classification and connected therewith accumulation of larger crystals in the respective crystallizers, whereby the larger crystals formed in one crystallizer are conveyed into the preceding warmer or hotter crystallizer or crystallizing stage and the largest crystals are then recovered from the first of the series of crystallizers. According to this method, the conveying of the crystals is carried out with a solution derived from the next hotter stage.

Broadly, the process of the above-mentioned U.S. patent comprises the steps of passing through a plurality of consecutive treatment stages maintained at progressively decreasing temperatures, a stream of a concentrated aqueous solution of crystallizable material, the solubility of which in the aqueous solution progressively decreases at the progressively decreasing temperatures maintained in the consecutive treatment stages so as to cause in each of the treatment stages formation of small crystals which, upon passage into the following treatment stages, will increase in size so as to form larger crystals, the stream of concentrated aqueous solution being moved in upward direction at each of the consecutive treatment stages at a speed smaller than the speed at the preceding treatment stage so as to form at each treatment stage an upwardly directed stream portion moving upwardly at a speed which is smaller than the speed of upward movement at the preceding treatment stage but greater than the speed of upward movement at the following treatment stage so that at each of the treatment stages the size of the larger crystals which will be adapted to move downwardly in the upwardly directed stream due to their weight, will be greater than the size of the downwardly moving larger crystals in the upwardly directed stream of the following and smaller than at the preceding treatment stage, reintroducing the downwardly moving larger crystals from each of the treatment stages into the immediate preceding treatment stage at a point located upwardly of the upwardly directed stream portion in which the thus reintroduced larger crystals, due to their larger size, will also move downwardly in a direction opposite to the flow of the respective upwardly directed stream portion, thereby further increasing in size, and repeating the reintroduction of larger crystals from any treatment stage into the preceding treatment stage at a point located above the upwardly directed stream portion until substantially all of the larger crystals, while growing larger, are accumulating at a point of the first one of the consecutive treating stages located below the upwardly directed stream portion thereof.

The above-described process may be carried out in a vacuum crystallizing arrangement, which comprises a series of vacuum evaporators including a first and last evaporator arranged in an upwardly staggered relationship in the direction from the first toward the last evaporator, the evaporators, respectively, being maintained at consecutively lower subatmospheric pressures and correspondingly lower temperatures and arranged stepwise, in upwardly increased levels from the first towards the last evaporator, the height differential between adjacent evaporators corresponding to the pressure differential between the same so as to allow drawing liquid through the evaporators in the direction towards the last of the series of evaporators, conduit means for passings a concentrated solution of crystallizable material upwardly through the series of evaporators in the direction from the first toward the last evaporator, so as to cause crystallization of a portion of the material in the evaporators, respectively, forming therein larger and smaller crystals, the conduit means between each two successive evaporators including at least one upwardly extending conduit portion having such cross-sectional dimension that the upward speed of flow of the solution of crystallizable material will be so high as to permit downward passage of only larger crystals which exceed a predetermined minimum size thus separating downwardly passing crystals exceeding the predetermined size from crystals of smaller size which will continue to flow with the stream of concentrated solution, the upwardly extending conduit portions being in direction of flow from the first to the last evaporator of progressively increasing cross-sectional dimension, whereby the predetermined minimum size of larger crystals which are permitted to pass downwardly through the upwardly extending conduit portions, will progressively increase in direction from the last to the first evaporator, and means associated with each of the upwardly extending conduit portions for introducing the therein downwardly passing larger crystals into the preceding evaporator at a point located above the preceding upwardly extending conduit portion leading to the preceding evaporator.

According to this prior art method and utilizing the above-described device, it is possible to produce of a sylvite solution containing in grams per liter at 94°C., 247 grams potassium chloride, 205 grams sodium chloride, 5 grams magnesium chloride and 787 grams water, a highly concentrated potassium fertilizer having a grain size characteristic of 0.87 mm. with the following grain size distribution:

| Grain Size: | Percent by weight |
|---|---|
| Greater than 1 mm | 15.0 |
| 0.75–1 mm | 40.0 |
| 0.5–0.75 mm | 33.0 |
| 0.4–0.5 mm | 7.0 |
| 0.3–0.4 mm | 3.5 |
| 0.2–0.3 mm | 1.0 |
| 0.1–0.2 mm | 0.5 |

It is an object of the present invention to provide a method and device for obtaining coarse grain salts, for instance as described above, in a countercurrent crystallizing process carried out in several stages which make it possible to obtain a crystal mass of much coarser crystal size so that at least 80 percent and preferably 90 percent of the crystal mass will consist of crystals having a size greater than 1 mm and so that the grain size characteristic of the crystal mass according to Rosin-Rammler will be $d' = 1.5$ mm, and the coefficient of uniformity $n$ will be between 5 and 7.

Such uniform coarse and substantially spherical salt, for instance a potassium fertilizer salt, represents a substantial advance in the art, in view of the great advantages connected with the storage, transportation and utilization of such uniform coarse salt.

It is a further object of the present invention to provide a method and device which permits fully automatic control of the crystal size and size distribution which can be carried out from a central control station and will permit to obtain the desired product, i.e. a crystal mass of desired grain size and distribution independent from operational fluctuations.

SUMMARY OF THE INVENTION

In a crystallization process, the steps of passing through a plurality of consecutive treatment stages maintained at progressively decreasing temperatures a stream of a concentrated aqueous solution of crystallizable material the solubility of which in the aqueous solution progressively decreases at the progressively decreasing temperatures maintained in the consecutive treatment stages so as to cause in each of said treatment stages formation of crystals, said stream being divided into a portion and a remainder of said stream and said portion of the stream of concentrated aqueous solution being moved in upward direction at the lower portion of each of the consecutive treatment stages along a predetermined path at a controllable speed so as to form at each treatment stage along the predetermined path an upwardly directed stream portion, so that at each of the treatment stages larger crystals will be adapted to move downwardly along the predetermined path in countercurrent to the upwardly directed stream due to their relatively large weight; reintroducing a suspension of the downwardly moving larger crystals from each of the treatment stages into the immediate preceding treatment stage at a point located upwardly of said upwardly directed stream portion circulating and thereby mixing the reintroduced suspension with crystallizable material in the treatment stage whereby the thus-reintroduced crystals will grow further and due to their larger size will also move downwardly in a direction opposite to the flow of the respective upwardly directed stream portion, repeating the reintroduction of crystals from any treatment stage into the preceding treatment stage at a point located above the upwardly directed stream portion until substantially all of the larger crystals while growing larger are accumulating at a point of the first one of the consecutive treating stages located below the upwardly directed stream portion thereof, and adjustably controlling in each of the treatment stages, respectively, the speed of upward flow of the stream portion so that only crystals having a predetermined minimum size will be capable of moving downwardly in the respective stream portion in countercurrent thereto by introducing the remainder of the stream directly into the mixing zone so as to bypass said predetermined path and by adjusting the amount of the bypassing remainder of said stream. The present invention also contemplates a crystallizing apparatus for carrying out the above-described process, which apparatus comprises an upright crystallizing chamber having an open bottom end, a tubular upright separation chamber of limited cross section having an upper open end communicating with the open bottom end of the crystallizing chamber and having an open outlet end at its bottom, means for introducing into the open outlet end at the bottom of the separation chamber a fluid adapted to rise in the separation chamber and thereafter to enter the crystallizing chamber, means for admitting into the crystallizing chamber a suspension of crystals in a crystallizable solution, means for treating the suspension of crystals in the crystallizing solution in the crystallizing chamber so as to increase the size of the crystals which due to their weight will descend in the crystallizing chamber and the larger of which will pass through the separation chamber downwardly in countercurrent to the fluid rising therein, conduit means connected to the crystallizing chamber in the region of the open bottom end thereof and also connected to the means for introducing so as to convey if required also fluid from the introducing means directly into the crystallizing chamber bypassing the separation chamber, means associated with the conduit means for adjusting the amount of fluid admitted from the conduit means directly into the crystallizing chamber so as to thereby adjust upon supply of fluid at a uniform rate the amount of fluid introduced by the introducing means into the open outlet end at the bottom of the separation chamber thereby also adjusting the speed of the fluid rising in the separation chamber and also by adjustment of the speed of the rising fluid adjusting the minimum size of crystals passing downwardly through the separation chamber in countercurrent to the rising fluid therein, and outlet means at the bottom end of the separation chamber for removing a suspension of the larger crystals having passed downwardly through the separation chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
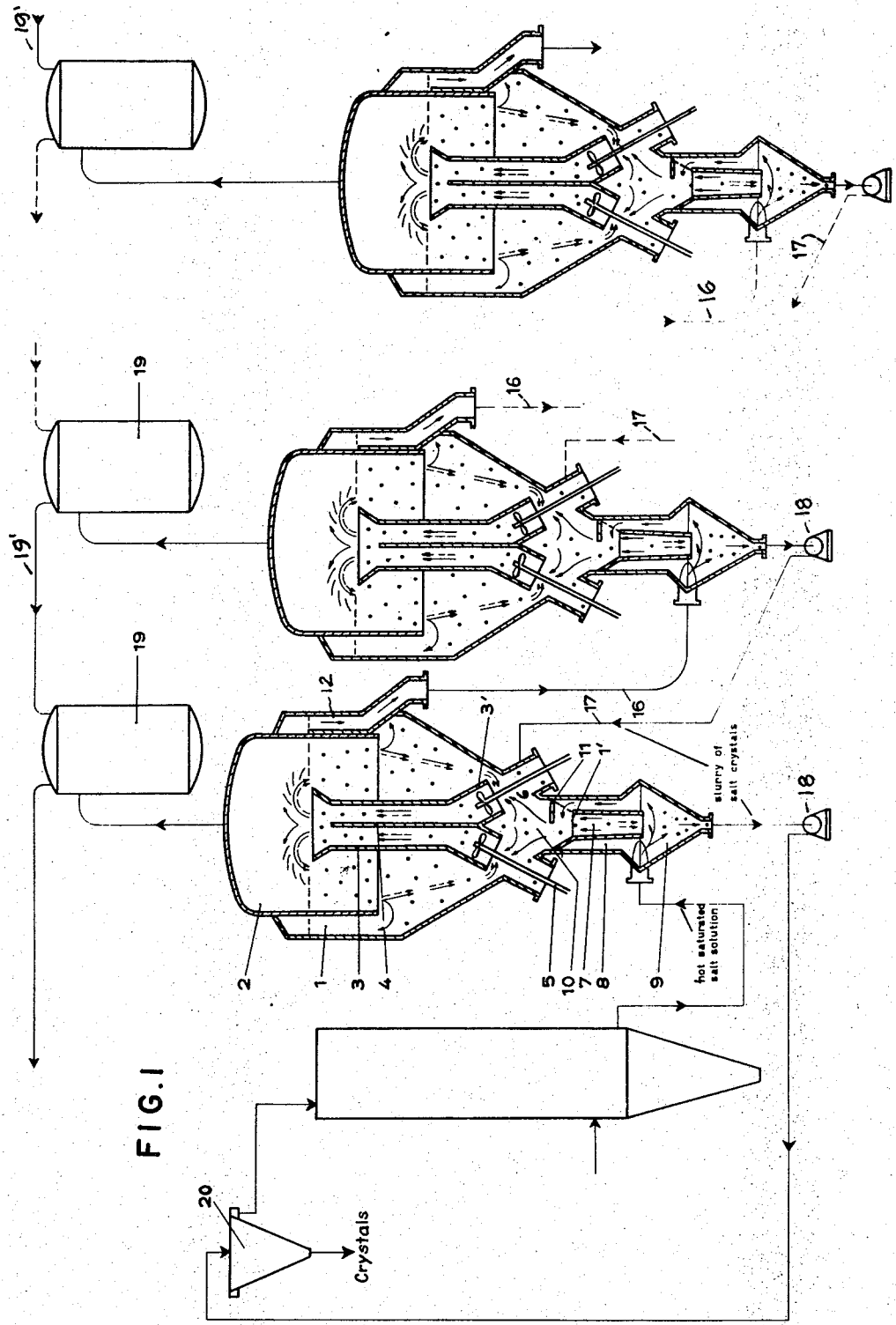
FIG. 1 is a schematic elevational view of a crystallizing arrangement in accordance with the present invention.

According to the present invention, coarse crystalline salts are recovered in countercurrent to the flow of the salt solution by cooling under vacuum a concentrated salt solution in several successive stages with continuous classification or size grading in such a manner that in each stage size grading of the crystals is carried out and the larger crystals from the respective stage are passed into the preceding warmer stage and finally, from the first stage into which the hot initial salt solution is introduced, the size graded largest crystals are recovered.

According to the present invention, the hot saturated salt solution is introduced tangentially at the largest diameter of a double cone located at the foot of a crystallizing apparatus and the thus introduced solution moves upwardly in a circular or helical movement into a separating section which extends downwardly into the double cone. In this manner, the hot saturated solution reaches the lower portion of the conical crystallizing space or chamber in which the thus upward moving solution will be mixed with solution previously introduced into the crystallizing chamber and already somewhat cooled. Furthermore, there is introduced into the crystallizing chamber a slurry or suspension of salt crystals which had been classified as the larger crystals in the next following cooler crystallizing stage and which, as described above, were removed from such next or successive crystallizing stage into the preceding crystallizing stage.

The thus-formed mixture of crystals received from the next successive crystallizing stage and of relatively hot solution introduced at the plane of the largest diameter of the double cone and rising upwardly in a tubular upright separation chamber is sucked into a circulating device through which the mixture will pass to the upper level of fluid contained in the respective crystallizing chamber, may be partially evaporated and cooled, whereby previously dissolved salt will be precipitated and cause growing of the circulating salt crystals. According to the present invention, the various process parameters, such as the proportion of classified large crystals which are withdrawn and the rate of introduction of fluids into the respective crystallizing chamber are so controlled that the solids concentration in the crystallizing chamber will be maintained between about 5 and 40 percent by weight and preferably between about 5 and 30 percent by weight. This control is primarily exercised by suitable adjustment of the speed of upward flow of concentrated solution through the tubular upright separation chamber, which speed in turn will control the minimum size of salt crystals which may drop through the separation chamber in countercurrent to the upward flow and which, below the separation chamber are withdrawn in the form of a slurry and introduced into the next preceding crystallizer, and by the withdrawal of cooled substantially solids-free solution, or solution containing only relatively small crystals which will overflow from the respective crystallizing chamber and introduced into the next following cooler crystallizing chamber.

Furthermore, according to the present invention, the speed of upward flow (which, as pointed out, preferably will be a helical flow) in the tubular upright separator chamber of each crystallizing device is controlled independently from the total amount of solution which is introduced into the respective crystallizer from the overflow of the preceding crystallizer, by means of a bypass arrangement which permits a controllable proportion of the total amount of thus-introduced solution to pass into the mixing zone in the lower portion of the crystallizing chamber without having to flow through the tubular upright separation chamber. The bypass communicates with the mixing zone of the crystallizing chamber through a valve or flap-controlled opening, the adjustment of which will control the proportion of concentrated solution which will be introduced through the bypass. Obviously, the greater the proportion which is introduced through the bypass, the lower will be the upward speed in the tubular separation chamber and, consequently, the smaller may be the crystals which still will flow downwardly through the separation chamber in countercurrent to the upwardly flowing solution.

The valve or flap control of the bypass opening may be actuated by a pneumatically activated separating cylinder.

It is possible in this manner, i.e. primarily by controlling the speed of upward flow of concentrated solution from the preceding crystallizer through the tubular upright separation chamber, to maintain within the crystallizing chamber a solids concentration within the desired range of between about 5 and 40 percent, preferably between about 5 and 30 percent, and to withdraw accordingly through the tubular separation chamber, in countercurrent to the upwardly flowing concentrated solution, crystals which have grown above a predetermined minimum size.

It is also within the scope of the present invention to maintain the desired solids concentration in the respective crystallizing chamber by continuous determination thereof in a conventional manner, which determination will automatically actuate conventional control devices which in turn will cause the valve or other control means which control the size of the opening in the bypass to be so adjusted as to maintain the desired solids concentration.

In this manner, in each of the crystallizing chambers, crystals will be produced which have a predetermined size, which predetermined size will increase in the direction from the last and coldest crystallizing chamber towards the first and hottest crystallizing chamber. It is furthermore desirable and within the scope of the present invention to carry out the circulation of the mixture of concentrated solution from the preceding crystallizer and crystal suspension from the next following crystallizer in such a manner and in such correlation to the residence time of the mixture in the respective crystallizer that the temperature of the thus-formed mixture will be only between 0.5 and 2°C. above the temperature of the solution which overflows from the upper portion of the respective crystallizing chamber.

Furthermore, according to a preferred embodiment of the present invention, a portion of the largest crystals, i.e. the crystals which are withdrawn from the first of the series of crystallizing apparatus, will be recycled into the last and coldest crystallizing apparatus of the series to serve therein, so to say, as seed crystals so that the material removed from the solution in such last crystallizing chamber will attach itself to the introduced relatively large crystals, causing further growth thereof.

Referring now to the drawings, it will be seen that an arrangement for carrying out the multi-step countercurrent crystallization by means of vacuum evaporation and cooling of a solution, in accordance with the present invention, comprises crystallizer or crystallizing apparatus 1 which includes a conventional diving bell 2 which is so arranged that between the upper wall portion of crystallizing chamber 1 and diving bell 2 an annular overflow 12 will be formed. In the center of diving bell 2, preferably coaxially therewith, a guiding tube 3 is arranged which is divided by separating wall 4 into two symmetrical halves and which guiding tube forks in its lower portion into two tubes 3' which house stirrers 5, the latter serving for forming within tube 3 the above-described mixture of the two fluids which are introduced into the respective crystallizer, namely the crystal slurry derived through conduits 17 and pumps 18 from the next following crystallizer and the hot solution obtained from the overflow 12 and conduit 16 of the preceding crystallizer. The lower, conical portion 10 of the crystallizing chamber communicates through the openings 6 with the interior of the tubes 3' and with its open bottom end 1' with a separating zone or chamber of preferably slightly conical configuration, specifically the above-described upright tubular separation chamber located in a separating housing 8 which, together with tubular separation chamber 7, forms the annular bypass communication of which with the lower portion of the crystallizing chamber is controlled by a flap-valve or the like means 11. The lower portion of tubular separation chamber 7 is located in and communicates with a double cone 9, the latter forming the bottom portion of the entire crystallizing apparatus.

The foregoing corresponds substantially to what is illustrated in FIG. 1 wherein it is also indicated that a plurality of crystallizing apparatus may be arranged in series and, preferably between 4 and 10 crystallizing apparatus or stages are thus arranged at progressively lower elevations. The vacuum evaporation cooling of the solution vapor in each of the respective crystallizing apparatus of the series of preferably between 4 and 10 crystallizers is arranged in conventional manner by cooling devices 19 respectively connected by conduits to the upper ends of the diving bells 2 and into which cooling media are introduced through conduits 19'.

The method of the present invention, i.e. the multi-step countercurrent crystallization by vacuum cooling and partial evaporation of a solution, when carried out for instance in a device as described above, will permit in a continuous manner and on an industrial scale, with completely automatic control of the solids concentration in the respective crystallizing apparatus, which control may be carried out from a central station, to obtain a uniform, substantially spherical crystalline mass of the following grain size distribution:

| Grain Size in mm.: | Percent by weight |
|---|---|
| 1.6–2.0 | 22.5 |
| 1.0–1.6 | 65.5 |
| 0.8–1 | 8.0 |
| 0.5–0.8 | 4.0 |

The grain size characteristic $d' = 1.5$ mm and the coefficient of uniformity $n = 5.23$.

The thus-obtained crystal mass is distinguished over similar crystal masses which could be obtained up to now by concurrent or countercurrent crystallization in vacuum cooling devices from comparable salt solutions, by the considerably larger grain size and the surprising uniformity of the size of the substantially spherical grains. This constitutes a very significant technical advance which, apparently, up to now could not be achieved in the industrial production of salt crystals.

The method and device of the present invention are suitable for obtaining a substantially uniform mass of crystals from solutions of a great variety of solids, for instance sodium chloride an ammonium sulfate solutions or solutions of other salts, particularly also fertilizer salts derived from the hard salt solutions of the potassium salt industry, all of which can be produced according to the present invention in coarse crystalline form and with a very narrow grain size distribution.

Furthermore, it has been found advantageous in accordance with the present invention to subject the hot moist salt crystals which are withdrawn from the first crystallizer of the above-described crystallizing arrangement to mechanical separation from adhering solution, by filtering or decanting or settling in devices 20 in a per se conventional manner and thereafter to remove residual moisture by drying with warm air, preferably having a temperature of between about 30 and 80°C., preferably by fluidizing the moist crystals in the drying air.

In contrast thereto, up to now, the moist salts were conventionally dried in drum driers or the like, by means of hot gases, which, for instance in the case of potassium salt crystals, were maintained at a temperature of between about 600 and 800°C. Such high temperature of the drying gas was necessary up to now due to the fact that the moist salt crystals which were separated from the mother liquor had a residual moisture of between about 6 and 10 percent. A lower moisture content could not be obtained in a crystal mass consisting of crystals of the grain size ranges which were obtainable up to now and which practically are below 0.5 mm.

It is thus a particularly advantageous feature of the present invention to combine the formation of very large and uniform crystals with the above-described drying process.

The hot moist salt crystals which are obtained in accordance with the present invention and the major portion of which, for instance between 80 and 90 percent, have a size greater than 1 mm, has the advantage which could not be achieved with the mass of smaller crystals obtained according to prior art methods, that by filtration and particularly centrifuging of the separated salt the residual moisture content can be lowered practically to below 1 percent. This substantial removal of residual moisture by mechanical separation such as centrifuging is further facilitated in accordance with the present invention by the fact that the mass of large crystals is withdrawn from the hottest stage of the crystallizing arrangement.

Thus, the method of the present invention offers the very significant technical advantage that hot air of relatively low temperature, as described above, suffices for removal of the residual moisture of the crystallized mass in order to obtain in per se conventional drying devices a substantially completely dry product. Thus, the expense for installation and operation of the drying device is greatly reduced and particularly drying devices of substantially smaller dimensions will suffice such as conventional hot air driers according to which the hot air is introduced into the mass of moist salt from below so as to fluidize the moist salt crystals and simultaneously remove the residual moisture therefrom.

In the case of salts the solubility of which is independent from the temperature, crystallization can be successfully carried out only if the solution is concentrated, i.e. the solvent such as water is completely or partially removed by evaporation.

Figure 2:
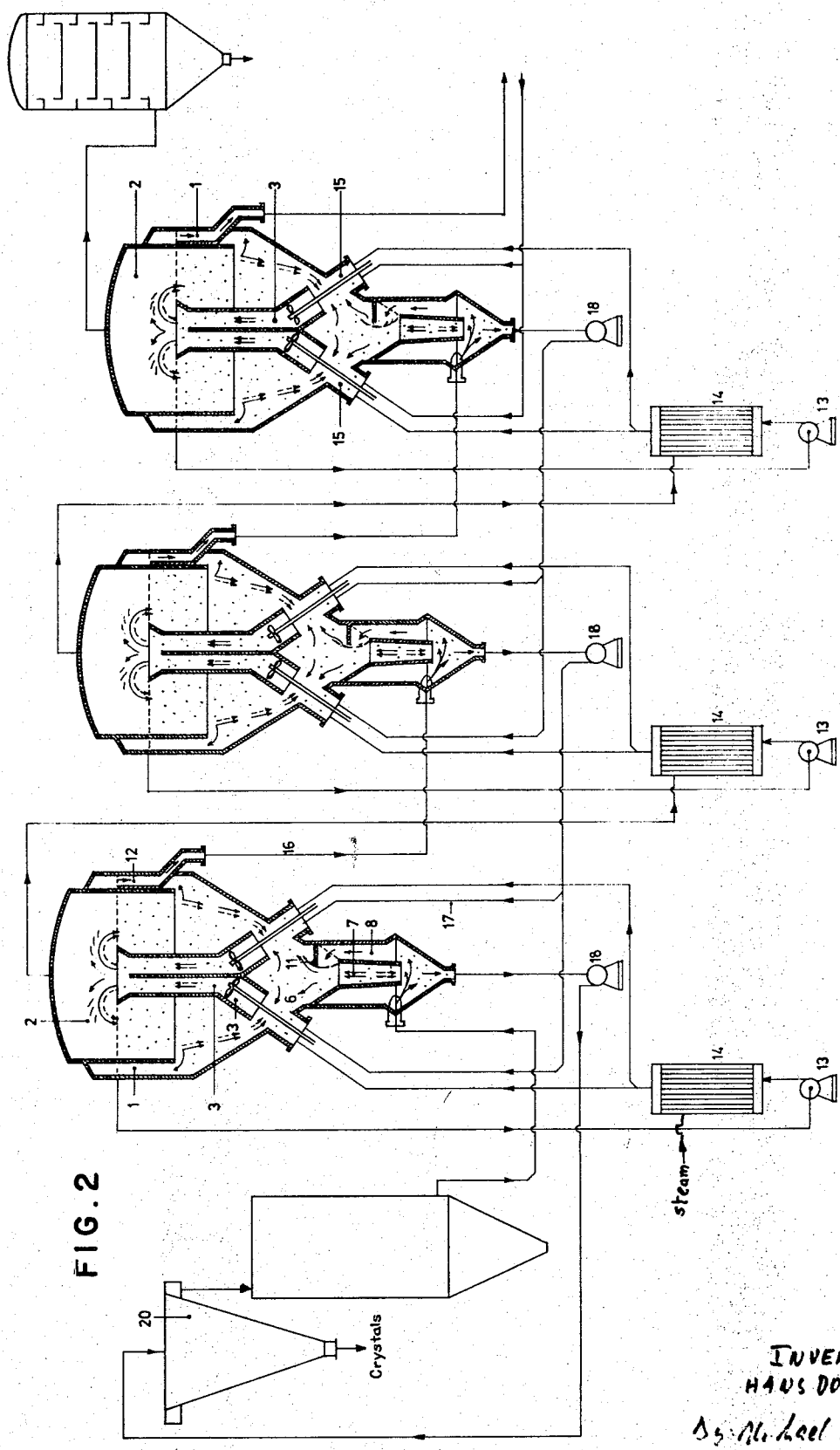
FIG. 2 is a schematic elevational view of another embodiment of a crystallizing arrangement in accordance with the present invention.

It has been found that the present invention which has been described above primarily with respect to vacuum cooling crystallization can be also excellently utilized in the case of multistage evaporation crystallization, whereby generally a 3—6 stage evaporation has been found to give the desired results. Preferred conditions for carrying out such multistage evaporation crystallization in accordance with the present invention are schematically illustrated in FIG. 2, whereby an amount of solution which corresponds about to the throughput during 1 hour is withdrawn from the annular space 12 between crystallizer and diving bell 2 of the first stage, and pumped by means of pump 13 via indirect heat exchanger 14 (the latter being heated with live steam) and introduced at 15 into the lower portion of the forked lower part of central guiding tube 3. Similarly, solution from annular space 12 of crystallizers are withdrawn and passed via a pump 13 and a heat exchanger 14 back to point 15 of the same crystallizer, whereby the heating of the heat exchangers 14 of successive stages may be carried out with the vapors of the preceding evaporation stage.

The method of the present invention may thus be also described as a method for obtaining and drying coarse grained salt crystals by vacuum cooling of a solution with continuous size classification of the formed crystals whereby in each of the multi-stages classification of the crystal is carried out and the withdrawn larger crystals are introduced into the preceding hotter crystallization stage an from the first crystallization stage into which the hot initial solution is introduced, the largest crystals are withdrawn, whereby the hot saturated solution is introduced tangentially at the largest diameter of a double cone at the bottom of the respective crystallizing apparatus and rises into the lower portion of a conical crystallizing space, mixes with a cooled solution already present in the crystallizing apparatus and into which also the classified larger salt crystals from the next following cooler stage are introduced in the form of a suspension thereof in salt solution, the mixture reaching the surface of the crystallizing apparatus at which the solution may be partially vaporized and will be cooled whereby crystallizing salt will cause growth of the salt crystals introduced into the respective crystallizer from the next following cooler crystallizer, and the largest thus-formed crystals, i.e. crystals whose weight is sufficiently high so that they will flow downwardly in countercurrent to the upwardly flowing concentrated solution, will drop in the double coned bottom portion of the device, and will be carried in the form of a suspension thereof by means of a pump towards the preceding hotter crystallizing stage, and wherein the cooled solution which may be free of crystals or may contain some relatively small crystals flows from the respective crystallizer through an overflow to the next following cooler stage.

The method of the present invention will be further characterized by introducing the solution into the double cone at the bottom of the respective crystallizer apparatus in such a manner that the solution will rise in a circular or helical movement in a separation zone into which the double cone reaches; by sucking the mixture of the suspensions and solutions introduced into the respective crystallizer into a tube which will cause mixing of the respective constituents and a circulation within the crystallizer, preferably so that the mixture will rise through a central tube and will flow outwardly from the upper end thereof then downwardly through peripheral zones of the crystallizer back to the bottom portion whereby the larger crystals formed in the respective crystallizer will then drop further through the separation zone and through the overflow in the upper portion of the crystallizer a relatively crystal-free solution will be withdrawn.

Furthermore, the present invention provides that within the respective crystallizers a solids concentration is preferably maintained within the range of between about 5 and 40 percent by weight and most preferably between about 5 and 30 percent by weight, which concentration is primarily controlled by the upward speed of inflowing solution in a zone in which the larger crystals must pass in countercurrent to such upwardly flowing solution in order to reach the bottom portion of the device for removal therefrom.

It is furthermore within the scope of the present invention to control the speed of upward flow of the solution in the separation zone or the tubular upright separation chamber of each crystallizer independently from the rate of throughput of solution, by arranging a bypass for part of the solution which communicates at the upper conical portion of the separation zone with the crystallizing chamber whereby the communication between the bypass and the crystallizing chamber is controlled by a valve or flap arrangement so that part of the solution will bypass the upright separation tube and thereby reducing the upward speed of the solution therein below the value which would be attained if all of the solution would have to pass therethrough. The minimum size of salt crystals which will be capable to be separated by flowing downwardly in countercurrent with the upwardly flowing solution in the upright separation chamber will depend on the speed of upward flow of the solution. The greater the speed of upward flow, the greater will be the minimum size of crystals required for countercurrent passage through the separation tube or chamber.

It is thus easily within the skill of the operator to so arrange the amount of solution which passes through the bypass and thus also the amount of solution which passes through the upright tubular separation chamber as to increase progressively the size of crystals withdrawn from the respective crystallizing apparatus in the direction from the last and coolest apparatus toward the first and hottest apparatus.

Furthermore, the present invention proposes that the solution circulating in the crystallizing chamber will be maintained in such ratio to the throughput per unit of time that the temperature of the mixture of hot solution introduced from the preceding crystallizer and crystal slurry of lower temperature introduced from the next following crystallizer will be only between about 0.5 and 2°C. above the temperature at which solution passes from the overflow of the respective crystallizer towards the next following crystallizer.

It will be understood that each of the elements described above, or two or more together, may also find a useful application of other types of crystallizing arrangements differing from the types described above.

While the invention has been illustrated and described as embodied in a multi-stage vacuum cooling or a multi-stage evaporator crystallizing arrangement, it is not intended to be limited to the details shown, since various modifications and structural changes may be made without departing in any way from the spirit of the present invention.

I claim:

1. A crystallizing apparatus comprising, in combination, an upright crystallizing chamber having an open bottom end; a tubular upright separation chamber of limited cross-section having an upper open end connected to said open bottom end of said crystallizing chamber and having an open inlet end at its bottom; means for introducing into said open end at the bottom of said separation chamber a fluid adapted to rise in said separation chamber and thereafter said crystallizing chamber; means for admitting into said crystallizing chamber a suspension of crystals in a crystallizable solution; means for treating said suspension of crystals in said crystallizing solution in said crystallizing chamber so as to increase the size of said crystals which due to their weight will descend in said crystallizing chamber and the larger of which will pass through said separation chamber downwardly in countercurrent to the fluid rising therein; conduit means connected to said crystallizing chamber in the region of said open bottom end thereof and also connected to said means for introducing so as to convey if required also fluid from said introducing means directly into said crystallizing chamber by-passing said separation chamber; means associated with said conduit means for adjusting the amount of fluid admitted from said conduit means directly into said crystallizing chamber so to thereby adjust upon supply of fluid at a uniform amount of fluid introduced by said introducing means into said open end at the bottom of said separation chamber, thereby also adjusting the speed of the fluid rising in said separation chamber and by adjustment of the speed of the rising fluid, adjusting the minimum size of crystals passing downwardly through said separation chamber in countercurrent to said rising fluid therein, said adjusting means comprising a wall separating said conduit means from said open bottom end of said crystallizing chamber, said wall being formed with an opening therethrough, and including closing means for at least partially closing said opening so as to control by the degree of closing of said opening the amount of fluid admitted from said conduit means through said opening directly into said crystallizing chamber; and outlet means at the bottom end of said separation chamber for removing a suspension of larger crystals having passed downwardly through the separation chamber.

2. A vacuum crystallizing arrangement comprising, in combination, a series of vacuum crystallizing apparatus as defined in claim 1 and including means associated, respectively, with each but the first of said series of crystallizing apparatus for feeding said suspension of larger crystals from said outlet means to said means for admitting a suspension of crystals into the crystallizing chamber of the next-preceding crystallizing apparatus; and further including means associated, respectively, with each but the last of said series of crystallizing apparatus for feeding fluid from a portion of the respective crystallizing chamber located above said open bottom end thereof to said means for introducing fluid into the open outlet end at the bottom of the separation chamber of the next-following crystallizing apparatus.

3. A crystallizing apparatus as defined in claim 1, wherein said closing means is a valve means.

4. A crystallizing apparatus as defined in claim 3, wherein said valve means includes a pivotally movable flap.

5. A vacuum crystallizing arrangement, comprising, in combination, a series of vacuum evaporators, each including a crystallizing vessel having a lower conical portion, a bell-shaped member extending with its lower open end into the upper portion of said vessel and defining an annular space between a lower portion of said member and said upper portion of said vessel, a tubular extension extending downwardly from said lower conical portion of said vessel, a tubular member of larger diameter than said tubular extension surrounding the latter and the lower part of said conical portion of said vessel and communicating with said lower conical portion, a hollow double cone joined to the lower end of said tubular member and having an outlet at the lower small diameter end and inlet at the largest diameter of said double cone, central tube means communicating at the lower end thereof with said lower conical portion of said vessel adjacent said extension and having an upper end in said bell-shaped member, and means in said central tube means for causing upward flow of fluid through said tube means; means for feeding a hot solution in substantially tangential direction into said inlet of said double cone of a first one of said series of vacuum evaporators so that the solution passes in a spiral stream through said tubular extension into said conical portion and through said central tube means into said bell-shaped member; means for feeding crystals in partly cooled solution from the outlet of the double cone of each evaporator except the first one of said series into the lower end of the preceding evaporator; means for feeding partly cooled solution from said annular space of one evaporator into said inlet of said double cone of the following evaporator; and means for regulating the speed at which said solution passes upwardly through said tubular extension.

6. A vacuum crystallizing arrangement as defined in claim 5, wherein said lower conical portion and said tubular member of larger diameter are separated from each other by a wall formed with an opening, and including adjustable closing means for adjusting the size of the opening as desired between a fully opened and a closed condition.

7. In a crystallization process, the steps of passing through a plurality of consecutive treatment stages maintained at progressively decreasing temperatures a stream of a concentrated aqueous solution of crystallizable material the solubility of which in said aqueous solution progressively decreases at the progressively decreasing temperatures maintained in said consecutive treatment stages so as to cause in each of said treatment stages formation of crystals, said stream of concentrated aqueous solution being divided in a lower portion of each of said consecutive treatment stages into a portion and a remainder of said stream, and said portion of said stream of concentrated aqueous solution being moved in upward direction in said lower portion along a predetermined path at a controllable speed so as to form at each treatment stage along said predetermined path an upwardly directed stream portion, so that at each of said treatment stages larger crystals will be adapted to move downwardly along said predetermined path in countercurrent to said upwardly directed stream due to their relatively large weight; reintroducing a suspension of said downwardly moving larger crystals from each of said treatment stages into the immediate preceding treatment stage at a point located upwardly of said upwardly directed stream portion; circulating and thereby mixing said reintroduced suspension with crystallizable material in said treatment stage whereby the thus-reintroduced crystals will grow further and due to their larger size will also move downwardly in a direction opposite to the flow of the respective upwardly directed stream portion; repeating said reintroduction of crystals from each treatment stage into the preceding treatment stage at a point located above said upwardly directed stream portion until substantially all of said larger crystals while growing larger are accumulating at a point of the first one of said consecutive treatment stages located below said upwardly directed stream portion thereof; introducing the remainder of said stream directly into the corresponding treatment stage so as to bypass said predetermined path along which said portion of said stream is being moved in the lower portion of said treatment stage; and adjusting the amount of the bypassing remainder of the stream directly introduced into said treatment stage so as to vary and thereby adjust the amount of said first portion of said stream so as to control the speed of said upward flow of said stream portion so that only crystals having a predetermined minimum size will be capable of moving downwardly in the respective stream portion in countercurrent thereto.

8. A crystallization process as defined in claim 7, wherein the amount of mixture of circulating reintroduced suspension and crystallizable material in each treatment stage and the residence time of said mixture in the respective treatment stage are so adjusted relative to each other that the temperature of said mixture will be between about 0.5 and 2°C. higher than the temperature of concentrated aqueous solution passing from the respective treatment stage to the next-following one.

9. A crystallization process as defined in claim 7, and including the steps of recovering moist larger crystals from said point of the first one of said consecutive treating stages; and drying the thus-recovered moist crystals in a fluidized bed with air having a temperature of between about 30 and 80°C.

10. A crystallization process as defined in claim 7, wherein the upward speed of said stream portion and thus the downward movement of larger crystals in counter-current thereto is so adjusted that in the respective treatment stage a solids concentration of between about 5 and 40 percent by weight is maintained.

11. A crystallization process as defined in claim 10, wherein a solids concentration of between about 5 and 30 percent by weight is maintained and wherein said upwardly moving stream portion moves along a substantially helical path.